(12) United States Patent
Jarrett

(10) Patent No.: US 10,881,101 B2
(45) Date of Patent: Jan. 5, 2021

(54) MECHANICAL INSECTICIDE

(71) Applicant: Cody E. Jarrett, Herriman, UT (US)

(72) Inventor: Cody E. Jarrett, Herriman, UT (US)

( * ) Notice: Subject to any disclaimer, the term of this patent is extended or adjusted under 35 U.S.C. 154(b) by 107 days.

(21) Appl. No.: 16/217,895

(22) Filed: Dec. 12, 2018

(65) Prior Publication Data

US 2020/0187493 A1 Jun. 18, 2020

(51) Int. Cl.
*A01N 25/08* (2006.01)
*A01N 59/00* (2006.01)

(52) U.S. Cl.
CPC ............. *A01N 25/08* (2013.01); *A01N 59/00* (2013.01)

(58) Field of Classification Search
USPC ................. 424/409, 405, 406, 411; 47/1.5
See application file for complete search history.

(56) References Cited

U.S. PATENT DOCUMENTS

| | | | | |
|---|---|---|---|---|
| 5,186,935 A * | 2/1993 | Tucker | ................. | A01N 25/006 424/405 |
| 5,773,017 A * | 6/1998 | Korunic | ................. | A01N 59/00 424/409 |
| 6,399,185 B1 * | 6/2002 | Cathey | ................. | A01K 1/0154 428/221 |
| 2009/0019765 A1 * | 1/2009 | Kosinski | ................. | A01G 24/00 47/64 |
| 2013/0101654 A1 * | 4/2013 | Mathis | ................. | A01N 59/00 424/405 |
| 2014/0026478 A1 * | 1/2014 | Degaspari | ................. | A01G 2/00 47/58.1 R |
| 2014/0141183 A1 * | 5/2014 | Arnott | ................. | A47G 7/08 428/33 |
| 2015/0007486 A1 * | 1/2015 | Backmark | ................. | A01M 1/14 43/114 |
| 2016/0059208 A1 * | 3/2016 | Wanene | ................. | B01J 20/14 502/411 |
| 2016/0219860 A1 * | 8/2016 | Klein | ................. | A01M 29/34 |
| 2017/0058451 A1 * | 3/2017 | Smith | ................. | D01D 5/18 |
| 2018/0310567 A1 * | 11/2018 | Criggall | ................. | A01N 25/10 |

* cited by examiner

*Primary Examiner* — Nina Bhat

(74) *Attorney, Agent, or Firm* — Fabian VanCott; Eric D. Nielson

(57) ABSTRACT

A mechanical insecticide including: a biodegradable substrate; and a layer of mineral particles partially embedded in a surface of the biodegradable substrate.

15 Claims, 4 Drawing Sheets

MECHANICAL INSECTICIDE

BACKGROUND

Mechanical insecticides provide some advantages over chemical insecticides. Mechanical insecticides are generally not absorbed into the plants and/or vegetables being grown. Mechanical insecticides may be readily washed from plants. Mechanical insecticides may allow the produced product to be labeled as organic depending on the specifics of the certification framework. Mechanical insecticides may be safer for pets, children, and/or adults in a garden or other growing area.

BRIEF DESCRIPTION OF THE DRAWINGS

The accompanying drawings illustrate various examples of the principles described herein and are a part of the specification. The illustrated examples do not limit the scope of the claims.

Figure 1:
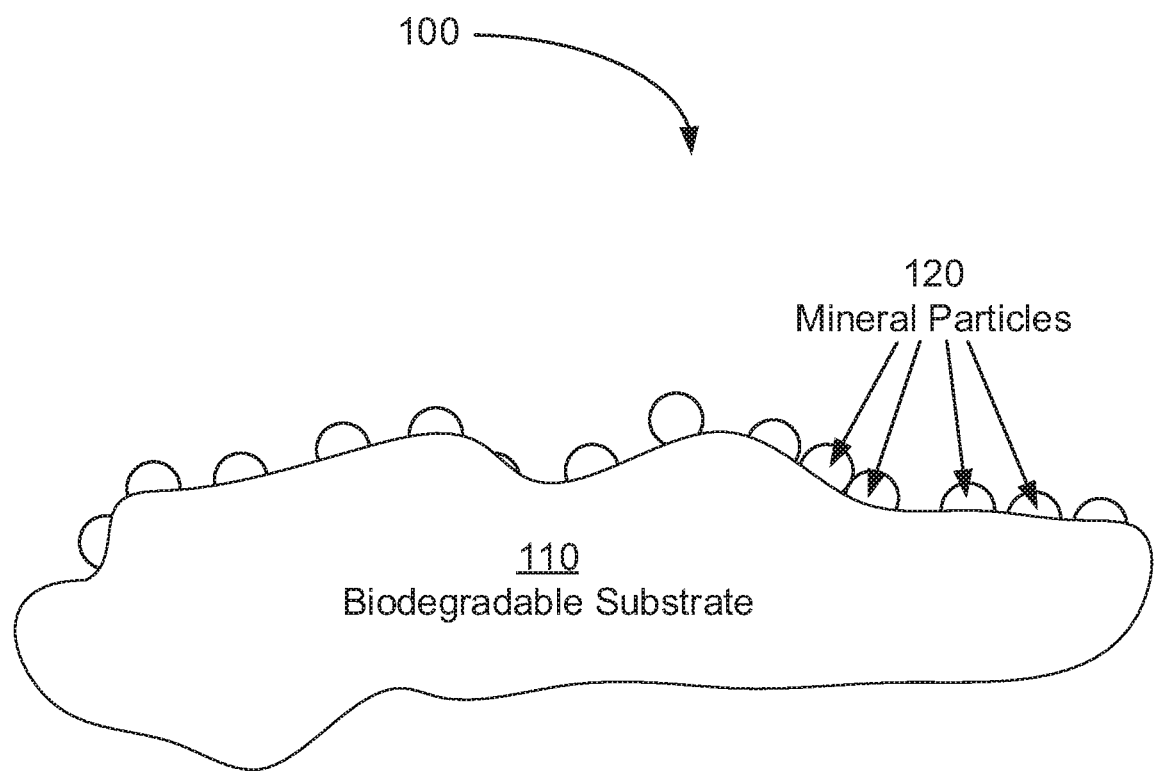
FIG. 1 shows a mechanical insecticide in an example consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Diatomaceous earth (DE) is a naturally occurring, soft, siliceous sedimentary rock that is easily crumbled into a fine white to off-white powder. It may have a particle size ranging from less than 3 µm to more than 1 mm, but more typically 10 to 200 µm. Depending on the granularity, this powder can have an abrasive feel, similar to pumice powder, and has a low density as a result of its high porosity.

Diatomaceous earth consists of fossilized remains of diatoms, a type of hard-shelled protist (chrysophytes). Diatomaceous earth is found in natural deposits of different ages around the world. Different deposits of distomaceous earth are distinguished by the makeup of the diatoms, trace materials, and/or differences in porosity. Food grade diatomaceous earth is available from commercial suppliers and DE has been used in a wide variety of products.

Diatomaceous earth has been used as a mechanical insecticide. The mechanism of its effectiveness is not entirely clear. Leading theories include mechanical puncture of the exoskeleton of the insect and/or stripping a water insulating layer from the carapace of the exoskeleton. The mode of insect death is believed to be fluid loss. However, applying diatomaceous earth presents a number of challenges for both safety and efficacy.

Inhaled powders, including silicate powders, have been shown to be related to lung disease. A wide variety of occupational hazard studies have shown inhaled powders to be correlated to lung disease. While asbestoses is widely known, coal dust, weaving dust, cement dust, etc. have all be shown to present hazards. Interestingly, some data suggest that DE presents less of a hazard than more crystalized silicates, however, the use of non-absorbable powders where inhalation is a possibility is still a presumed safety hazard. Similarly, placing the powders in areas where children and/or pets are active may present undesired risks.

Applying powders to plants and/or planting areas has other challenges. Powders are vulnerable to being moved by wind and/or animals. Distributing powders evenly may present a mechanical challenge and/or be time consuming. Powder applied to leaves may hinder plants in the short term. Powders may be readily absorbed into the soil and/or groundcover, rendering the powder inactive for its desired purpose.

Accordingly, it is desirable to provide a way for a user to rapidly and safely apply diatomaceous earth in a garden or similar planting location. It is desirable to maintain the efficacy of the DE as a mechanical insecticide when doing so. Finally, the method of application preferentially preserves organic and similar certifications.

Among other examples, this specification describes a mechanical insecticide including: a biodegradable substrate; and a layer of mineral particles partially embedded in a surface of the biodegradable substrate.

Among other examples, this specification also describes a mechanical insecticide including: a biodegradable substrate; an adhesive on a surface of the biodegradable substrate; and a layer of diatomaceous earth partially embedded in the adhesive.

This specification also describes a method of producing a mechanical insecticide where the method includes adhering a layer of diatomaceous earth to a biodegradable substrate Turning now to the figures, FIG. 1 shows a mechanical insecticide (100) including: a biodegradable substrate (110); and a layer of mineral particles (120) partially embedded in a surface of the biodegradable substrate (110).

The mechanical insecticide (100) is a product for mechanically killing insects. Mechanical insecticides differ from chemical insecticides in that they depend on mechanical interactions to produce the damage to the insect which cause insect death. In contrast, chemical insecticides depend on a chemical interaction between the agent and the physiology of the insect. While chemical insecticides have seen widespread use, concerns about secondary impacts on humans and other animals remain. Further, conclusively establishing no harmful effects from chemical insecticides is difficult and expensive from an experimental design standpoint. Accordingly, application of the precautionary principle leads some consumers to avoid chemical insecticide treated products.

While mechanical insecticides present some unknowns, they have a long standing history of safe use and the types of potential hazards are less difficult to categorize as they are based on mechanical interactions, such as the hazard from powders discussed above.

The biodegradable substrate (110) provides a support to hold the layer of mineral particles (120) in place. This makes the application of the mechanical insecticide easier and safer as it may be applied in larger pieces. The election of a biodegradable substrate (110) also facilitates safe and/or beneficial incorporation into the soil.

The biodegradable substrate (110) may be a garden covering. The biodegradable substrate (110) may be selected from: bark, wood chips, straw, plant fiber, leaves, compost, fabric, landscape fabric, garden covering, mulch, wood pellets, and/or weed barrier. Some commercially available versions of polymer and/or rubber garden covers are biodegradable. The biodegradable substrate (110) provides additional functionality over the mechanical insecticide alone. The biodegradable substrate (110) may enhance moisture retention, reduce weeds, provide ground cover, reduce mud, etc. The biodegradable substrate (110) also supports and stabilizes the layer of mineral particles (120). In an example, the mechanical insecticide (100) is garden bark with embedded diatomaceous earth.

As used in this specification and associated claims, biodegradable means a material which is subject to decomposition by natural organisms when left in an outdoor planting area. Generally speaking metals, glasses, ceramics and some polymers are not considered biodegradable despite undergoing chemical changes in natural environments.

The layer of mineral particles (120) provides the mechanical component of the mechanical insecticide. The layer of mineral particles (120) is supported by the biodegradable substrate (110). This allows easy application and avoids many of the problems with use of diatomaceous earth while retaining the mechanical insecticide functionality of the layer of mineral particles (120).

The layer of mineral particles (120) may include a silicate. The layer of mineral particles (120) may include diatomaceous earth. The particles of the layer of mineral particles (120) may have a mean number average diameter of no more than 20 microns. In one example, the layer of mineral particles (120) has a mean number average diameter of 5 to 15 microns. The particles of the layer of mineral particles (120) may be milled and/or crushed. The particles of the layer of mineral particles (120) may be heated prior to application.

The layer of mechanical particles (120) may be adhered to the biodegradable substrate (110) by mechanical interlock. In one example, the biodegradable substrate is soaked in a liquid pretreatment to soften the substrate. The particles of the layer of mineral particles are then pressed into the surface of the biodegradable substrate (110). The pressing of the mineral particles may be with a mechanical plate. The pressing of the mineral particles may be performed with a fluid jet, for example, a sandblaster. When the biodegradable substrate (110) dries, the particles remain partially embedded in the biodegradable substrate (110).

Figure 2:
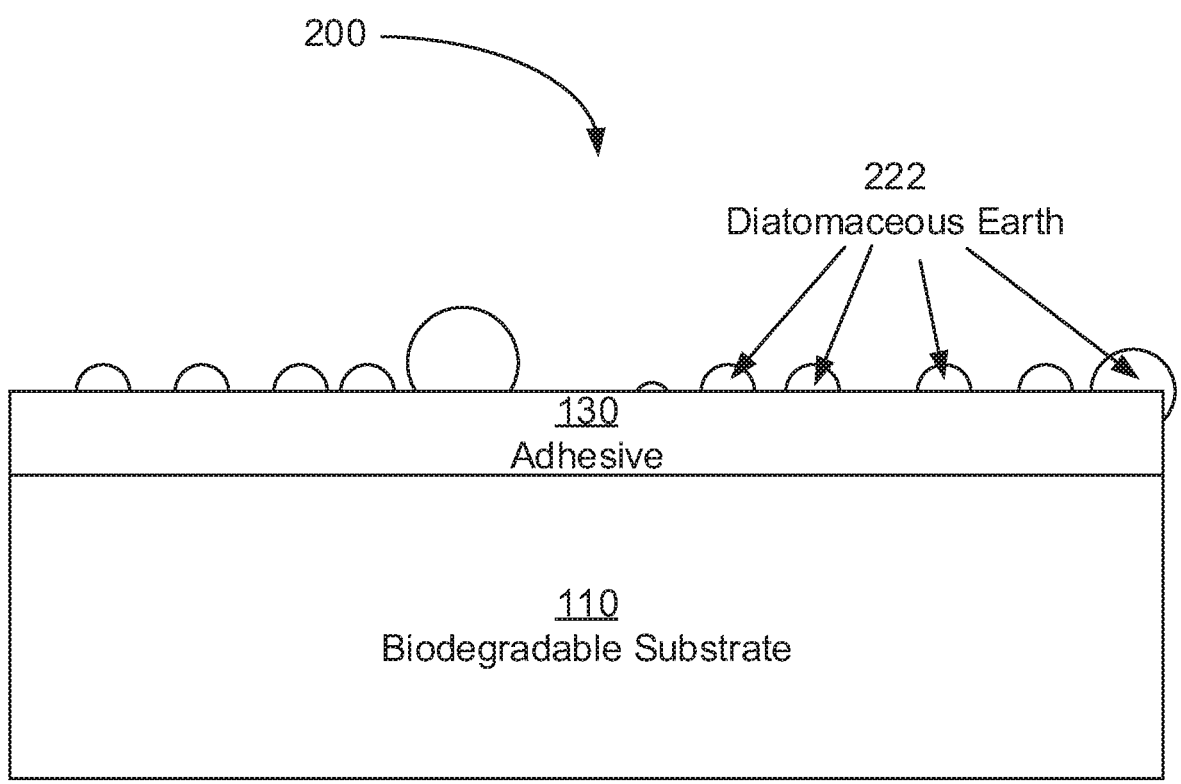
FIG. 2 shows a mechanical insecticide in an example consistent with this specification.

FIG. 2 shows a mechanical insecticide (200) including: a biodegradable substrate (110); an adhesive (130) on a surface of the biodegradable substrate (110); and a layer of diatomaceous earth (222) partially embedded in the adhesive (130).

The insecticide (200) is made of a biodegradable substrate (110) with a layer of diatomaceous earth (222) embedded in an adhesive (130). The biodegradable substrate (110) provides a support for the functionality of the layer of diatomaceous earth (222). The attachment of the layer of diatomaceous earth (222) to the biodegradable substrate (110) facilitates placement and stabilization of the mechanical insecticide (200) while reducing and/or avoiding the problems associated with powders.

The adhesive (130) may be a biodegradable adhesive. In an example, the adhesive (130) is a starch based adhesive (130). The adhesive (130) may be a protein based adhesive (130). The adhesive (130) retains the particles in the layer of diatomaceous earth (222) under rain and similar conditions. The adhesive (130) may degrade under biodegradation into a fertilizer. Selection of a protein and/or starch based adhesive also provides a fertilizer benefit to the area. This is helpful, for example, in mechanical insecticides (200) which are applied and then allowed to decompose and become part of the soil.

The layer of diatomaceous earth (222) includes particles of less than 10 microns in diameter. The layer of diatomaceous earth (222) may include particles of less than 5 microns in diameter. The layer of diatomaceous earth (222) may be processed prior to application. For example, the particles may be milled, heated, rolled, crushed, filtered, sifted, etc. to prepare the diatomaceous earth prior to application as a layer of diatomaceous earth (222).

Figure 3:
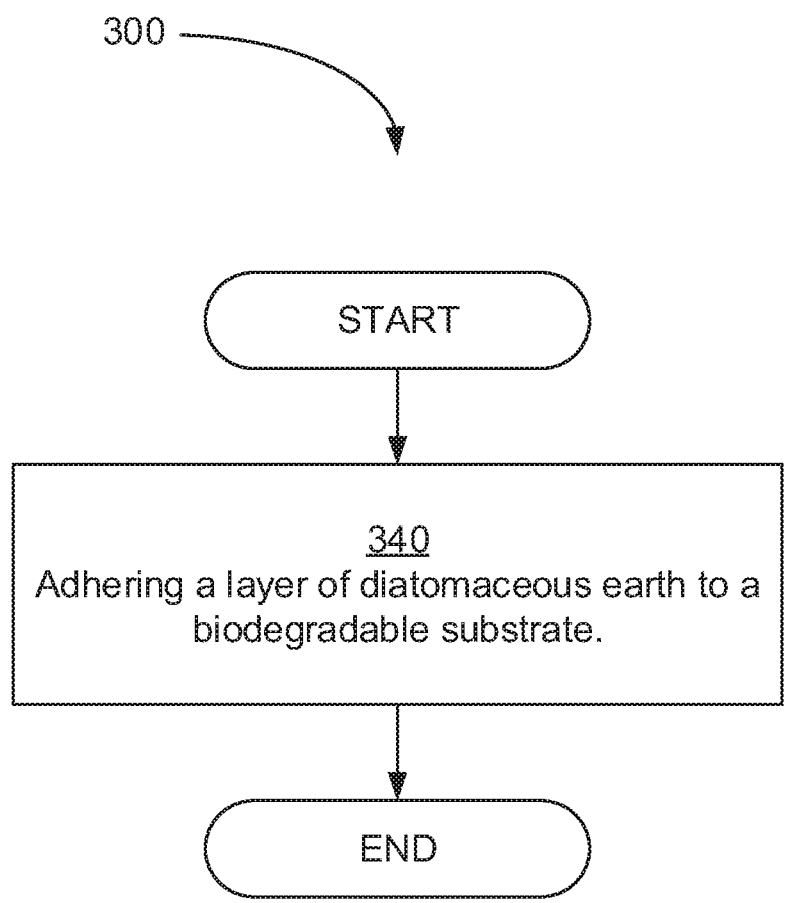
FIG. 3 shows a flowchart of a method of producing a mechanical insecticide consistent with this specification.

FIG. 3 shows a flowchart of a method (300) of producing a mechanical insecticide (100) consistent with this specification. The method (300) includes adhering a layer of diatomaceous earth (222) to a biodegradable substrate (110) (340).

The method (300) includes adhering a layer of diatomaceous earth (222) to a biodegradable substrate (110) (340).

The biodegradable substrate (110) may include bark.

The method (300) may further include soaking the biodegradable substrate in a liquid to soften the biodegradable substrate prior to applying the layer of diatomaceous earth. Soaking may soften the biodegradable substrate (110) to enhance adhesion of the mineral particles and/or diatomaceous earth. In an example, the liquid is water. The liquid may include other components such as a fertilizer, a fungicide, a preservative, etc.

Figure 4:
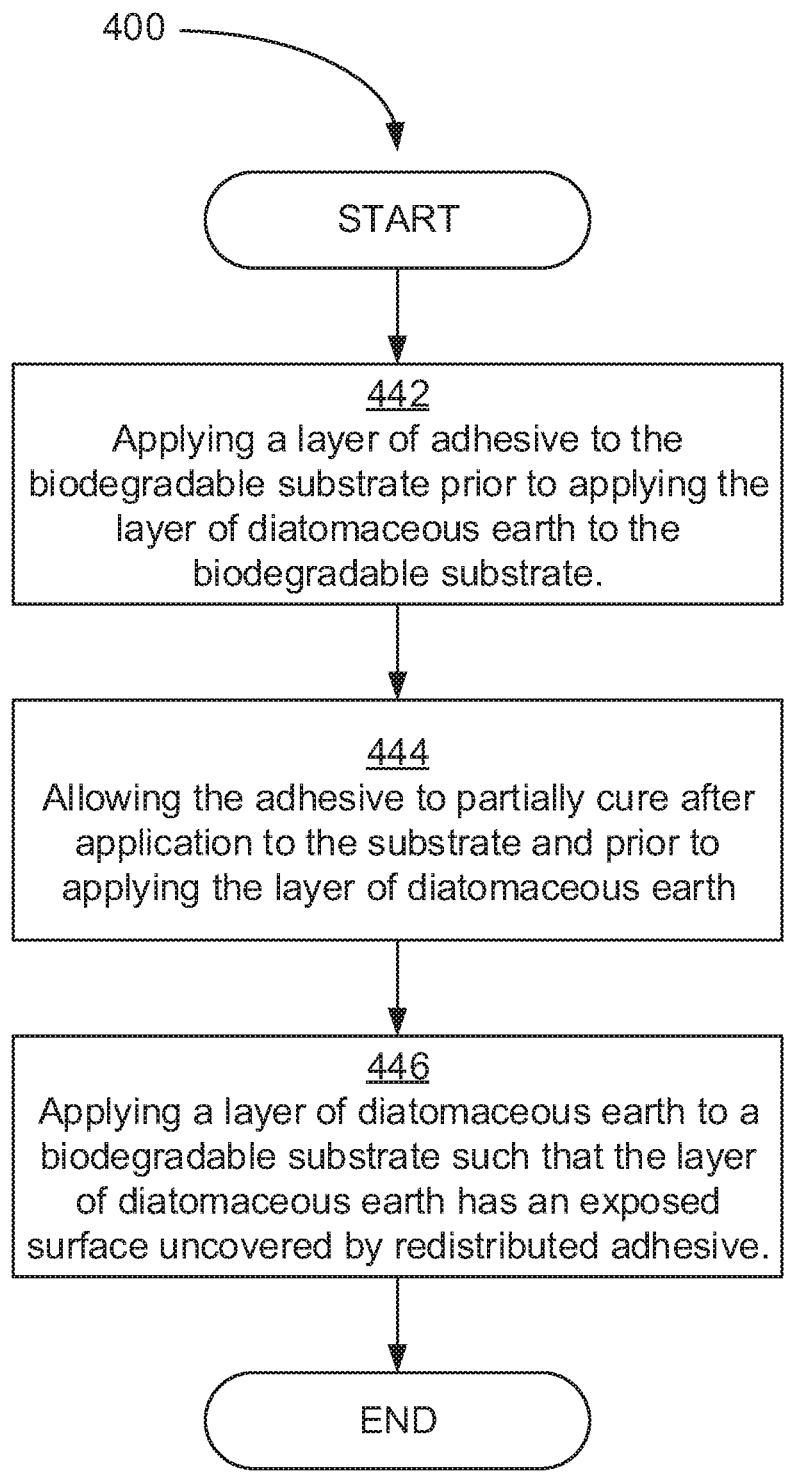
FIG. 4 shows a flowchart of a method of producing a mechanical insecticide consistent with this specification.

FIG. 4 shows a flowchart of a method (400) of producing a mechanical insecticide (100) consistent with this specification. The method (400) includes: applying a layer of adhesive (130) to the biodegradable substrate (110) prior to applying the layer of diatomaceous earth (222) to the biodegradable substrate (110) (442); allowing the adhesive (130) to partially cure after application to the substrate (110) and prior to applying the layer of diatomaceous earth (222) such that the layer of diatomaceous earth (222) has an exposed surface uncovered by redistributed adhesive (130) (444); and adhering a layer of diatomaceous earth (222) to the biodegradable substrate (110) (446).

The method (400) includes applying a layer of adhesive (130) to the biodegradable substrate (110) prior to applying the layer of diatomaceous earth (222) to the biodegradable substrate (110) (442). The adhesive may be a biodegradable adhesive (130) which decomposes into a fertilizer.

The method (400) includes allowing the adhesive (130) to partially cure after application to the substrate (110) and prior to applying the layer of diatomaceous earth (222) such that the layer of diatomaceous earth (222) has an exposed surface uncovered by redistributed adhesive (130) (444).

The method (400) includes adhering a layer of diatomaceous earth (222) to the biodegradable substrate (110) (446). In some examples, the layer of diatomaceous earth may include other components.

The adhesive (130) and diatomaceous earth (222) may be applied on both sides of the biodegradable substrate (110). The adhesive (130) and diatomaceous earth (222) may be applied on a single side of the biodegradable substrate. In an example, the adhesive is patterned on the surface of the biodegradable substrate (110) to produce a pattern of areas of adhered diatomaceous earth (222) and uncovered areas. In some examples, a hatched pattern or a series of lines is used. A checkered pattern may be applied. In some examples, having an "edge" to the region of diatomaceous earth (222) enhances its effectiveness as a mechanical insecticide.

It will be appreciated that, within the principles described by this specification, a vast number of variations exist. It should also be appreciated that the examples described are only examples, and are not intended to limit the scope, applicability, or construction of the claims in any way.

What is claimed is:

1. A mechanical insecticide comprising:
   a biodegradable substrate, wherein the biodegradable substrate is bark; and
   a layer of mineral particles partially embedded in a surface of the biodegradable substrate, wherein the layer of mineral particles comprise diatomaceous earth.

2. The mechanical insecticide of claim 1, wherein particles of the layer of mineral particles have a mean number average diameter of no more than 20 microns.

3. The mechanical insecticide of claim 1, wherein the biodegradable substrate and mineral particles embedded in the surface of the biodegradable substrate consists essentially of bark embedded with diatomaceous earth.

4. A mechanical insecticide comprising:
   a biodegradable substrate, wherein the biodegradable substrate comprises bark;
   an adhesive on a surface of the biodegradable substrate; and
   a layer of diatomaceous earth partially embedded in the adhesive, wherein the adhesive is a starch-based adhesive.

5. The mechanical insecticide of claim 4, wherein the adhesive degrades under biodegradation into a fertilizer.

6. The mechanical insecticide of claim 4, wherein the layer of diatomaceous earth comprises particles of less than 10 microns in diameter.

7. A method of manufacturing a mechanical insecticide comprising:
   applying a starch-based adhesive to bark; and
   adhering a layer of diatomaceous earth to the adhesive.

8. The mechanical insecticide of claim 4, wherein the adhesive and diatomaceous earth are patterned on the surface of the bark.

9. The mechanical insecticide of claim 8, wherein the pattern is a series of lines.

10. The mechanical insecticide of claim 8, wherein the pattern is a hatched pattern.

11. The mechanical insecticide of claim 8, wherein the pattern is a checkerboard pattern.

12. The method of claim 7, wherein the starch-based adhesive is applied as a series of lines.

13. The method of claim 7, wherein the starch-based adhesive is applied as a hatched pattern.

14. The method of claim 7, further comprising partially curing the adhesive prior to applying the diatomaceous earth.

15. The method of claim 7, further comprising applying a second layer of starch-based adhesive on another surface of the bark and applying diatomaceous earth to the second layer of adhesive.

* * * * *